United States Patent
Cunningham et al.

(10) Patent No.: US 10,838,928 B2
(45) Date of Patent: *Nov. 17, 2020

(54) MAINTAINING A MASTER SCHEMA

(71) Applicant: International Business Machines Corporation, Armonk, NY (US)

(72) Inventors: Gerard Cunningham, Dublin (IE); John B. Meade, Dunshaughlin (IE)

(73) Assignee: International Business Machines Corporation, Armonk, NY (US)

( * ) Notice: Subject to any disclaimer, the term of this patent is extended or adjusted under 35 U.S.C. 154(b) by 878 days.

This patent is subject to a terminal disclaimer.

(21) Appl. No.: 15/144,866

(22) Filed: May 3, 2016

(65) Prior Publication Data
US 2016/0364417 A1   Dec. 15, 2016

Related U.S. Application Data

(63) Continuation of application No. 14/735,192, filed on Jun. 10, 2015.

(51) Int. Cl.
| G06F 16/00 | (2019.01) |
| G06F 16/21 | (2019.01) |
| G06F 16/23 | (2019.01) |
| G06F 16/27 | (2019.01) |

(52) U.S. Cl.
CPC ............ *G06F 16/212* (2019.01); *G06F 16/23* (2019.01); *G06F 16/27* (2019.01)

(58) Field of Classification Search
CPC ......... G06F 17/30294; G06F 17/30292; G06F 16/23; G06F 16/27; G06F 16/212
USPC ......................................................... 707/634
See application file for complete search history.

(56) References Cited

U.S. PATENT DOCUMENTS

| 6,970,876 B2 * | 11/2005 | Hotti ..................... G06F 16/211 707/634 |
| 7,401,090 B2 | 7/2008 | Desbiens et al. |
| 8,027,845 B2 | 9/2011 | Brennan et al. |
| 8,280,822 B2 | 10/2012 | McKeown |
| 8,302,071 B2 | 10/2012 | Gschwind et al. |
| 8,365,138 B2 * | 1/2013 | Iborra ...................... G06F 8/35 717/104 |

(Continued)

OTHER PUBLICATIONS

Data as a Service: A Framework for Providing Reusable Enterprise Data Services, IEEE, Pushpak Sarkar (Year: 2015).*

(Continued)

*Primary Examiner* — Jean M Corrielus
(74) *Attorney, Agent, or Firm* — William H. Hartwell; Steven McDaniel; Arnold B. Bangali

(57) ABSTRACT

As disclosed herein a method, executed by a computer, includes accessing a master schema defining one or more reference models, the master schema comprising a plurality of model elements each model element thereof comprising an element name and an element definition and fragmenting the master schema to provide a plurality of sub-projects. The method further includes identifying a change in a sub-project model element, updating the master schema according to the identified change to the sub-project model element, and distributing the updated master schema changes to other sub-projects that include the changed model element. A computer system, and a computer program product corresponding to the method are also disclosed herein.

9 Claims, 6 Drawing Sheets

(56) References Cited

U.S. PATENT DOCUMENTS

| | | | |
|---|---|---|---|
| 8,688,626 B2* | 4/2014 | Marrelli | G06Q 10/0633 707/603 |
| 8,725,522 B2 | 5/2014 | Balko | |
| 8,843,440 B2 | 9/2014 | Ahmed et al. | |
| 9,128,768 B2 | 9/2015 | Korovin et al. | |
| 9,292,306 B2* | 3/2016 | Day | G06F 9/451 |
| 9,378,071 B2* | 6/2016 | Scomparim | G06F 7/00 |
| 9,460,171 B2 | 10/2016 | Marrelli | |
| 9,898,703 B2* | 2/2018 | Carriere | G06Q 10/06 |
| 2002/0133368 A1 | 9/2002 | Strutt et al. | |
| 2002/0169745 A1* | 11/2002 | Hotti | G06F 16/211 |
| 2003/0088447 A1 | 5/2003 | Desbiens et al. | |
| 2003/0204592 A1 | 10/2003 | Crouse-Kemp | |
| 2005/0060342 A1* | 3/2005 | Farag | G06F 16/252 |
| 2005/0114829 A1* | 5/2005 | Robin | G06Q 10/06 717/101 |
| 2005/0125621 A1* | 6/2005 | Shah | G06F 16/284 711/173 |
| 2005/0256907 A1* | 11/2005 | Novik | G06F 16/1787 |
| 2005/0262008 A1* | 11/2005 | Cullen, III | G06Q 10/10 705/37 |
| 2006/0136250 A1* | 6/2006 | Farmilo | G06Q 10/067 705/7.37 |
| 2007/0005658 A1 | 1/2007 | Myllymaki | |
| 2008/0163156 A1 | 7/2008 | Grey | |
| 2008/0167183 A1* | 7/2008 | Hoekstra | B41M 5/46 503/201 |
| 2009/0003147 A1 | 1/2009 | Knappmann | |
| 2009/0006147 A1 | 1/2009 | Padmanabhan | |
| 2009/0013305 A1 | 1/2009 | Clarke | |
| 2010/0082497 A1* | 4/2010 | Biesemann | G06Q 10/06 705/301 |
| 2010/0100427 A1 | 4/2010 | McKeown | |
| 2012/0191650 A1 | 7/2012 | Ahmed et al. | |
| 2012/0232947 A1 | 9/2012 | McLachlan | |
| 2012/0323811 A1 | 12/2012 | McKeown, III | |
| 2013/0006883 A1* | 1/2013 | McKeown | G06Q 10/1057 705/320 |
| 2013/0067017 A1* | 3/2013 | Carriere | G06Q 10/06 709/208 |
| 2013/0080349 A1 | 3/2013 | Bhola et al. | |
| 2013/0080350 A1 | 3/2013 | Bhola et al. | |
| 2014/0207830 A1 | 7/2014 | Holmes et al. | |
| 2014/0222966 A1 | 8/2014 | Marins | |
| 2014/0236848 A1* | 8/2014 | Abhyanker | G06Q 10/10 705/319 |
| 2014/0280403 A1* | 9/2014 | Swansegar | G06F 16/9577 707/827 |
| 2015/0134589 A1 | 5/2015 | Marrelli | |
| 2015/0160988 A1* | 6/2015 | Scomparim | G06F 7/00 719/318 |
| 2016/0364416 A1 | 12/2016 | Cunningham et al. | |

OTHER PUBLICATIONS

Massa et al., "Business Model Innovation", Oxford Handbook of Innovation Management, 2013, pp. 1-43, <http://embaconsortium.org/wp-content/uploads/2013/09/Massa-Tucci-BMI-Oxford-Handbook-of-innovation.pdf>.

Cunningham et al., "Maintaining a Master Schema", U.S. Appl. No. 14/735,192, filed Jun. 10, 2015, 32 pages.

IBM Appendix P, list of patents and patent applications treated as related, May 3, 2016, 2 pages.

* cited by examiner

MAINTAINING A MASTER SCHEMA

BACKGROUND

The present invention relates to database maintenance, and more particularly to maintaining a master schema and associated sub-projects.

When industries develop large scale inter-related schemas and reference models, a solution may cover multiple overlapping business focus areas. Successfully developing a large scale solution often involves fragmenting the solution into discrete business focus areas. When development within a focus area is complete, the completed development then needs to be manually merged into a complete master solution. After manually merging the finished development, any other business focus areas that have been fragmented from the master solution need to be updated with any relevant changes that overlap their discrete business focus area.

SUMMARY

As disclosed herein a method, executed by a computer, includes accessing a master schema defining one or more reference models, the master schema comprising a plurality of model elements each model element thereof comprising an element name and an element definition and fragmenting the master schema to provide a plurality of sub-projects. The method further includes identifying a change in a sub-project model element, updating the master schema according to the identified change to the sub-project model element, and distributing the updated master schema changes to other sub-projects that include the changed model element. A computer system, and a computer program product corresponding to the method are also disclosed herein.

BRIEF DESCRIPTION OF THE DRAWINGS

Preferred embodiments of the present invention will now be described, by way of example only, with reference to the following drawings, in which.

DETAILED DESCRIPTION

Figure 1:
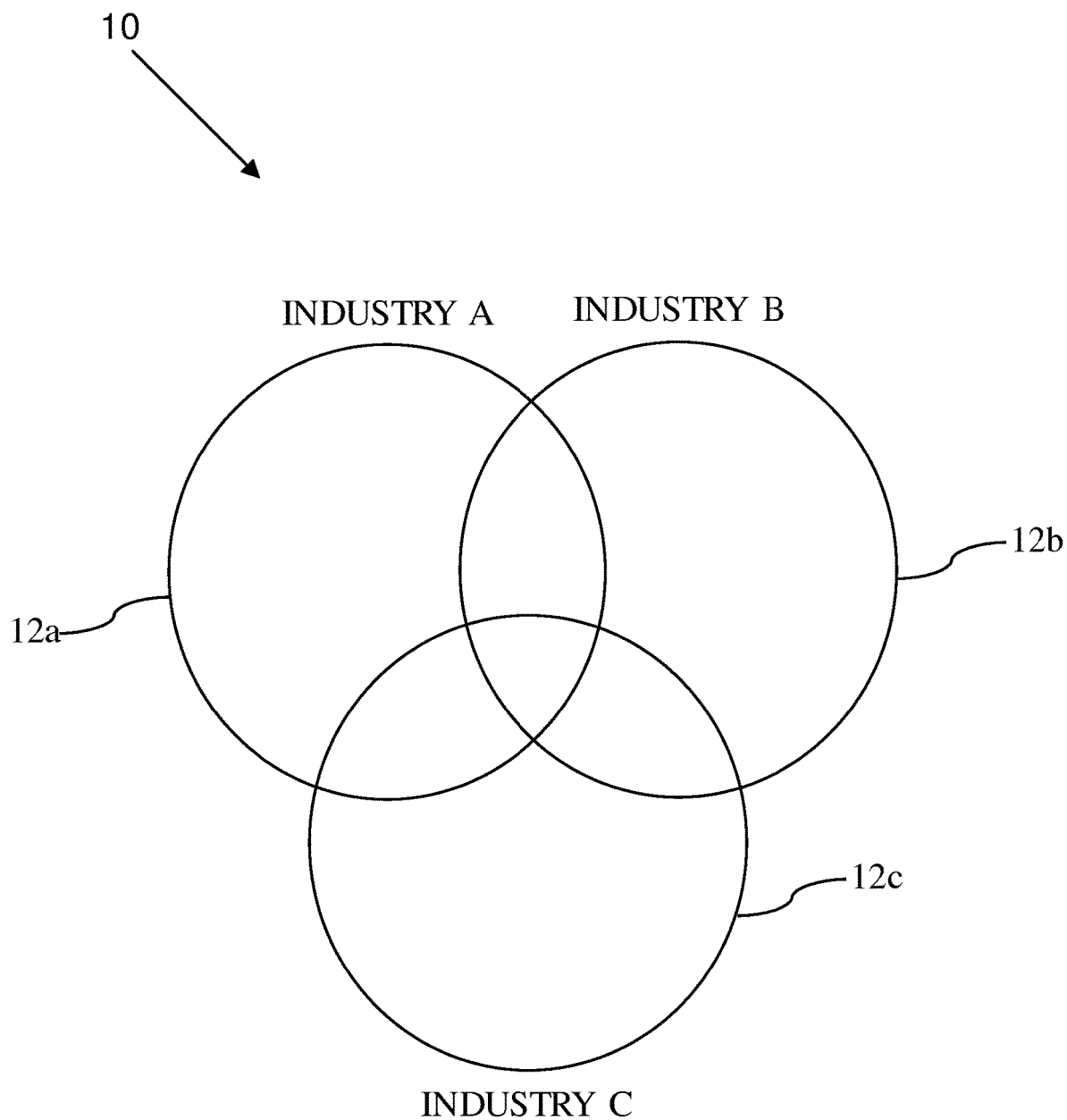
FIG. 1 is a schematic diagram of a master schema comprised of three reference models, in accordance with an embodiment of the present invention.

FIG. 1 shows a master schema 10 that comprises three different reference models 12a, 12b, and 12c, for different industries A, B and C, respectively. As can be seen in the Figure, when developing large scale inter-related schemas 10 and reference models (12a, 12b, and 12c) for industries, a completed solution will usually cover multiple overlapping business focus areas. To successfully develop such a large scale solution it is often best practice to fragment the solution into discrete business focus areas as sub-projects. When the development of the focus area is complete the finished development then needs to be harvested into the complete master solution. Once this is done, any other business focus areas that have been fragmented from the master solution need to be updated with any relevant changes that overlap their discrete business focus area.

Historically, the process of fragmenting the master solution into discrete business focus areas has required a manual effort of identifying the relevant business focus area content, normally involving one or more highly specialist engineers. Developers must manually carry out the fragmentation work by hand to produce the discrete business focus area coverage. Similarly, reconstituting the changes back into the master solution requires significant manual effort from the developers. The specialist engineer(s) must then identify all relevant new content added to the master solution that is pertinent and should be fragmented to all existing discrete business focus areas under development. This process is lengthy, expensive and is susceptible to errors.

In embodiments of the present invention, a system is used that provides an automated mechanism that leverages semantic analysis and inference rules to automatically fragment large-scale schemas 10 and reference models (12a, 12b, and 12c) into a set of multiple sub-deployments that target a discrete set of business focus areas. The system also monitors these sub-deployments and harvests any relevant changes back into the master solution and pushes any of these changes that are relevant into any other existing sub-deployments. All of this process can be carried out automatically, without the need to involve developers or specialist engineers, although before changes are committed to any of the sub-projects, these can be subject to a manual approval process.

The system tracks modifications made to model fragments and harvests them back to the original master model. The system preferably pushes trivial harvested changes to other existing model fragments automatically, however, where the changes are non-trivial or beyond the current scope of the existing model fragments users are notified of the change and they can choose to accept the change into their model, be it through source control management or by increasing their licensing subscription. The system can be extended so that new model fragments can be generated for previously unknown sub-deployments by injecting new inference rules, semantic knowledge (such as new industry terms, schemas and/or standards) into the existing system. This allows for expanding support of new business focus areas over time.

The development of two reference models for the banking and financial sectors, using development teams essentially working manually, can be described as follows. Two different teams are charged with updating the solution with content relevant to the banking sector and the financial sector. To increase development bandwidth, the teams work on a subset of the complete solution relevant to their target sector. These subset solutions will contain common elements, for example how to correctly model a customer/client guarantee arrangement from the master solution. The subsets will also have elements that are specific to their target sector, for example in the banking subset, how to model customer complaints, while in the financial subset how to model futures.

Before development can start, both teams need to agree which elements of the solution are common and which elements are specific to their target sector. Afterwards, the master solution must be manually fragmented into two sub-projects; this is a time consuming task and can take several attempts to complete correctly. Both teams can now work in parallel and because they both have copies of the common solution elements they can update the same elements independently of each other. It would be better if the changes in a particular sub-project that are common were automatically identified and harvested into the other sub-project to avoid duplication of work and reduce synchronization issues at the end of the development cycle.

At the end of development cycle, the two sub-projects are merged into the master solution. Since both sub-projects share common information it may be necessary to reconcile common changes and remove change conflicts. Again this can take several attempts to perform correctly. The development process then repeats itself by again beginning the manual fragmentation process.

Due to the overhead in fragmenting and harvesting changes between the three projects it is difficult to actively leverage common changes within the two sub-projects and to keep all three projects in sync with each other. As a result the development remains paused until the end of the development cycle and any shared work cannot be exploited until a new development cycle begins. This reduces productivity and enforces a waterfall style development as the current state of the reconciled master solution cannot be determined until the end of the development cycle.

This improved system removes the manual task of fragmenting the master solution into the sub-projects at the beginning of each development cycle. In contrast to the example discussed above, this frees up both of the teams to focus on development work rather than classifying content and fragmenting the models. As the process is automated, this removes the need for multiple attempts to correctly fragment the master solution into sub-projects. The entirety of the fragmenting process is carried out automatically and does not require any human input. This fragmentation process is described in detail below, and describes how a master schema can be automatically fragmented into sub-projects.

Once the development work is ongoing, the system actively monitors the sub-projects and identifies changes made in one sub-project that should be harvested into the other sub-project. Since the master solution is actively kept up-to-date during the entire development cycle by the system, this allows for continuous integration, which provides an up-to-date view of the development in progress allowing both teams to be pro-active to each other's changes and therefore adopt them at a quicker rate. A change in one sub-project is propagated back to the master schema, which is updated and any relevant change is pushed out to other sub-projects.

This system is extendable to multiple projects and is suited towards a cloud-based computing environment, including providing a subscription based service that provides access to individual industry focus areas rather than a large-scale solution with the option of harvesting changes back into the master solution and redistributing said changes to other subscribers, pending their subscription/licensing entitlements. A very large master schema could be fragmented into three or more sub-projects, all of which will be carried automatically, with a large saving in time and expense, and with a much greater robustness to errors. All of the sub-projects can be worked on at the same time by different development teams.

Figure 2:
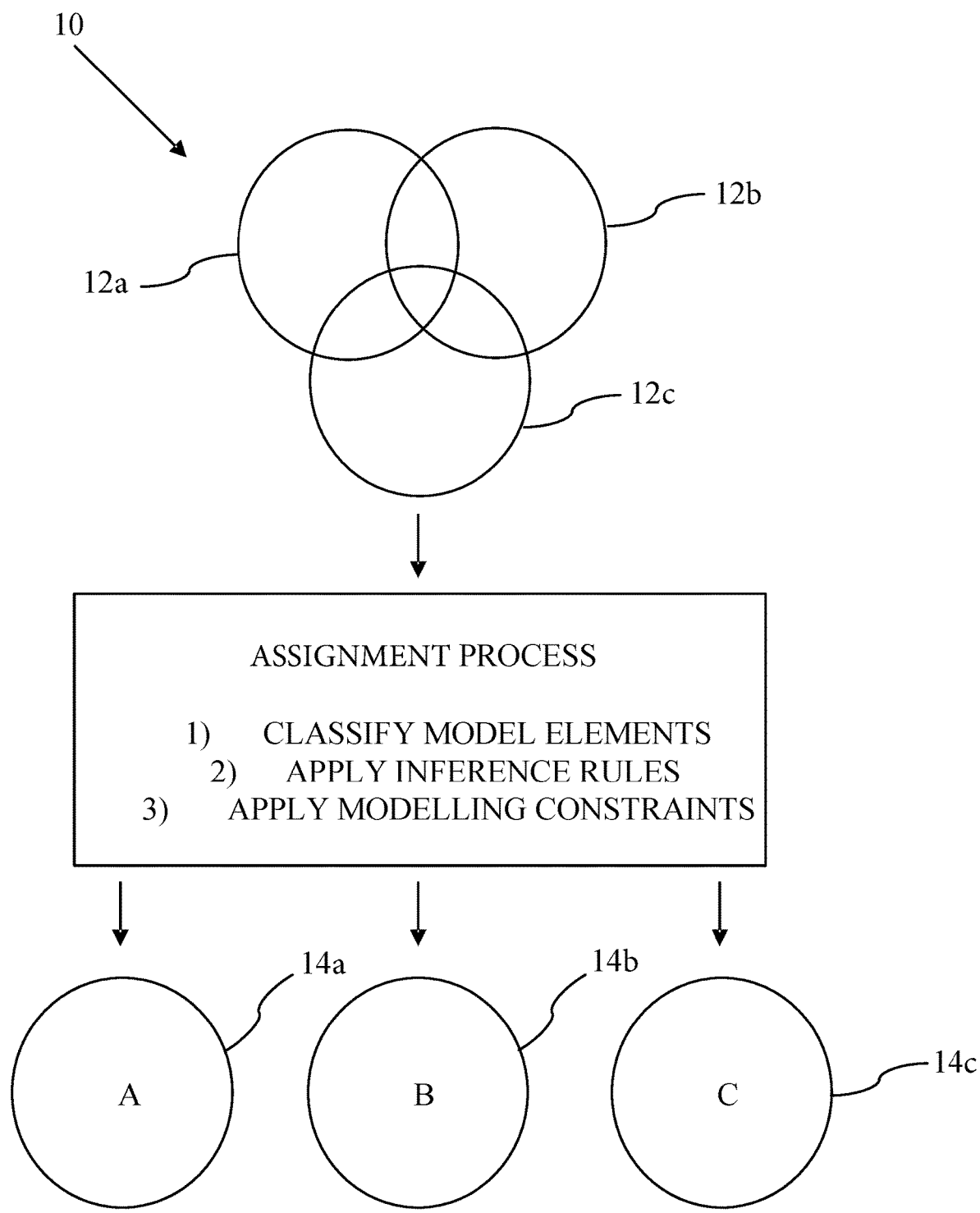
FIG. 2 is a schematic diagram of a fragmentation process, in accordance with an embodiment of the present invention.

The system can be broken down into two distinct phases of operation. FIG. 2 illustrates the first phase of the process carried out by the system, where the system fragments the master model schema 10 by assigning model elements (also referred to as "entities) of reference models 12a, 12b, and 12c to the required business focus areas 14a, 14b, and 14c (also referred to as "focus areas," "fragments," and "sub-projects"), respectively. This process can be implemented using the following three steps. Step 1 comprises classifying model elements in reference models 12a, 12b, and 12c of the master schema 10 as belonging to particular focus areas of focus areas 14a, 14b, or 14c, or common to all focus areas 14a, 14b, and 14c, using semantic equivalence. Model elements can be classified by analyzing their names and definition for semantic equivalence to known industry specific standards, for example ISO standards Basel II or HEDIS, to determine if they belong to a particular focus area of focus areas 14a, 14b, or 14c, in the previous examples these would be banking and healthcare. The semantic equivalence can be determined by using synonym, hypernym/hyponym inheritance, or holonym analysis.

Once model elements are classified, then in step 2, a set of inference rules can be applied to the remaining elements of the model to determine what other model elements must be also included in a focus area of focus areas 14a, 14b, or 14c. For example, if the analytical requirement credit risk assessment is determined to be essential for the banking focus area, then all model elements that are related to this analytical requirement, for example dimension, measures and business glossary terms should also be members of the banking focus area to ensure complete support of credit risk assessment. In this way all elements of the model can be considered and assigned to one or more fragments.

Finally, in step 3, a set of modelling constraints are applied to ensure the schema fragments produced (i.e., focus areas 14a, 14b, and 14c) are valid and complete referential integrity. For example, a modelling constraint could be: (i) all entities that support an identifying relationship to a classified entity must be part of the focus area; (ii) attributes of a classified entity must be part of the focus area; and (iii) any schema elements that model data derived from external sources (i.e., any source of data that is not directly modelled in or beyond the scope of the master model) and provide input to an analytical requirement must be part of the focus area. In this way, the modelling constraints can be used to ensure that all elements of the master schema 10 that are needed in a sub-project 14a, 14b, or 14c are actually present.

Figure 3:
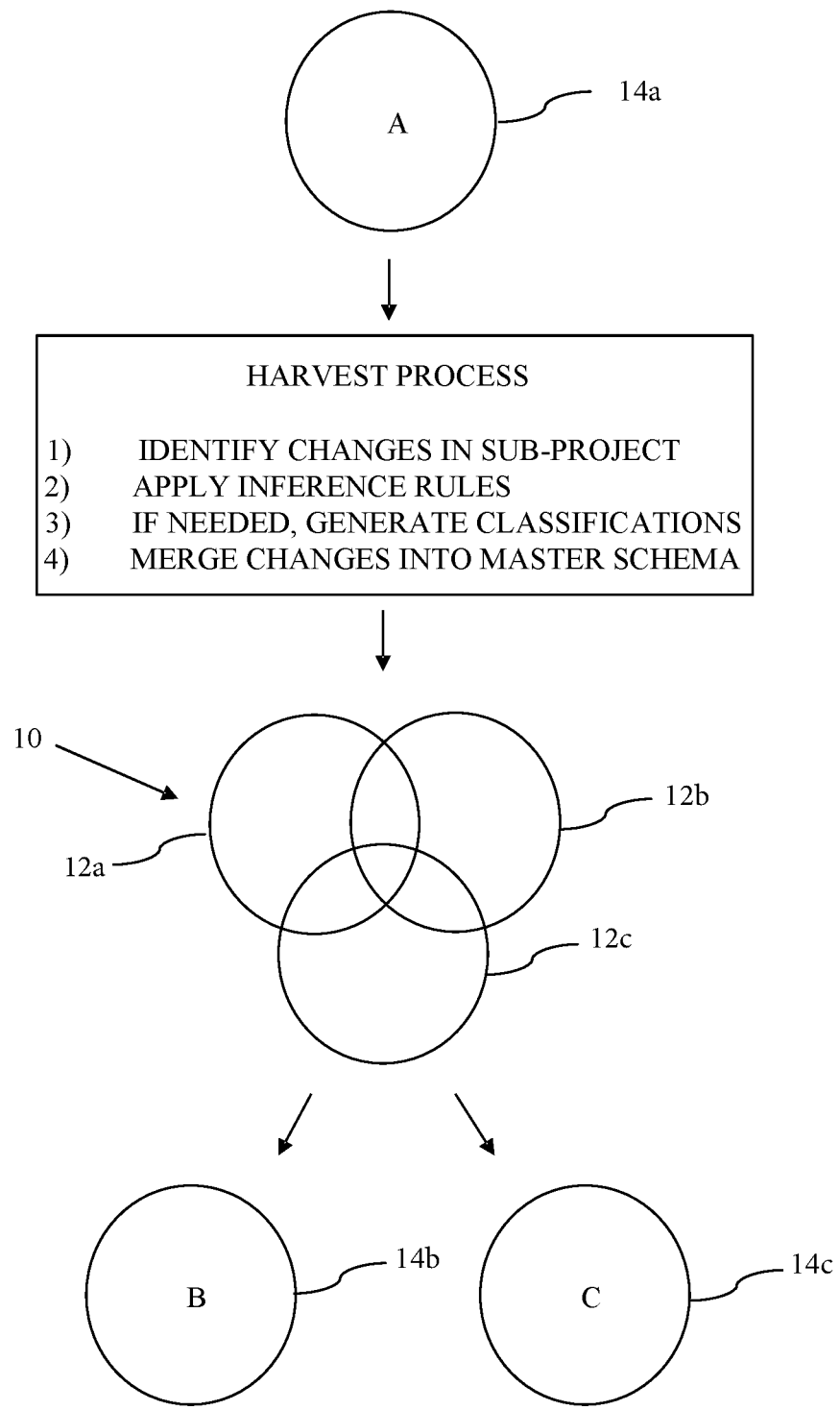
FIG. 3 is a schematic diagram of a harvesting process, in accordance with an embodiment of the present invention.

The second phase of the process is where the system monitors the individual focus areas 14a, 14b, and 14c for all changes delivered by the relevant development team and harvests these changes back into the master model (i.e. master schema 10) to feed back into the first phase, as illustrated in FIG. 3. The system begins by identifying changes in the sub-projects (e.g., sub-project 14a) and this can be carried out using standard diff-tools for models and schemas. Once the changes are identified, the existing industry classifications are propagated to the master schema 10 (including reference models 12a, 12b, and 12c) and ultimately to the other sub-projects (e.g. sub-projects 14b and 14c) using the same inference rules and system as those referred to above. In this way, the master schema 10 is continually updated as the development teams work on the specific sub-projects (e.g. sub-projects 14a, 14b, and 14c) with changes being propagated back to the master schema 10.

If new content is added that classifications cannot propagate to, then the semantic equivalence system used in the first phase is used again to apply classifications based on known industries. The changes are then merged into the master schema 10 using standard compare-merge systems. After which, the necessary steps are carried out to push all changes relevant to the remaining sub-projects.

Figure 4:
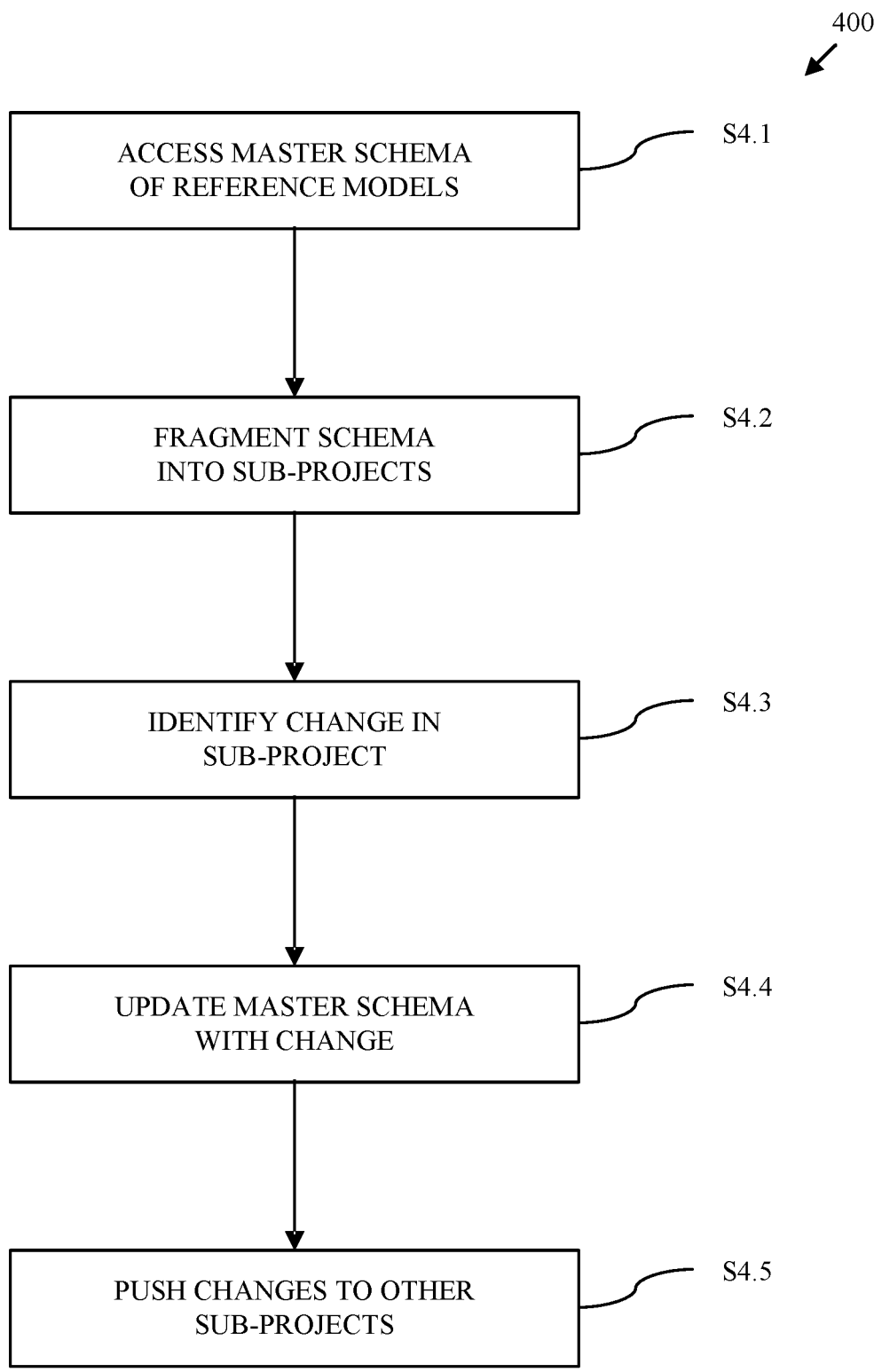
FIG. 4 is a flowchart of a fragmentation process and a harvesting process, in accordance with an embodiment of the present invention.

FIG. 4 is a flowchart depicting a fragmentation and a harvesting process 400. Fragmentation and a harvesting process 400 summarizes the two phases of the process in a single flowchart. Step S4.1 comprises accessing a master schema defining one or more reference models, the master schema comprising a plurality of model elements comprising element name and element definition. The models elements within the master schema each comprise element name and element definition and can also include meta-information stored for each element, such as mappings to other elements, relationships and constraints. The element data is not necessarily limited to a name and definition. Step S4.2 comprises fragmenting the master schema into a plurality of sub-projects by assigning model elements of the master schema to business focus areas, including classifying model elements as assigned to a sub-project focus area and applying a set of inference rules to any unassigned model elements to assign them to a sub-project. Step S4.3 comprises identifying a change in a sub-project model element, step S4.4 comprises updating a model element of the master schema according to the identified change to a sub-project model element, and finally step S4.5 comprises distributing the updated model element of the master schema to one or more (preferably all) other sub-projects that include the updated model element.

Figure 5A:
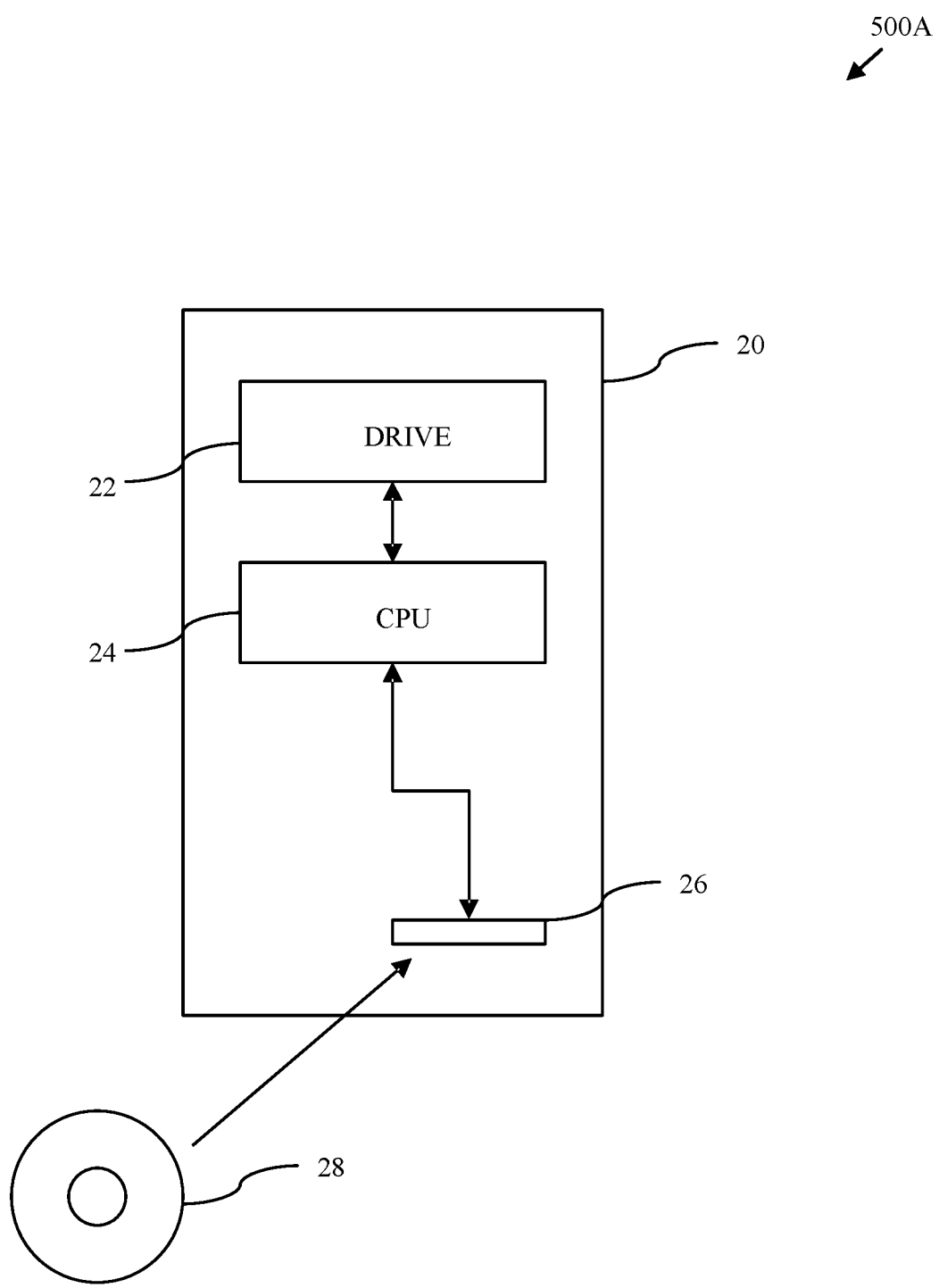
FIG. 5A is a schematic diagram of a server, in accordance with an embodiment of the present invention.

FIG. 5A shows a server 20 that comprises a storage device 22, a processor 24 connected to the storage device 22, and an external interface 26 that is also connected to the processor 24. A CD-ROM 28 is provided, which is a computer readable medium containing a computer program product that comprises instructions for controlling the operation of the processor 24. The server 20 can be operated to perform the computer-implemented method of FIG. 4. The storage device 22 is configured to store the master schema that defines one or more reference models, the master schema comprising a plurality of model elements comprising element name and element definition.

The processor 24 is configured to fragment the master schema into a plurality of sub-projects by classifying model elements as assigned to a sub-project focus area and applying a set of inference rules to any unassigned model elements to assign them to a sub-project, in the first phase of the method. The processor 24 is also configured, in the second phase of the method, to identify a change in a sub-project model element, update the master schema according to the identified change to a sub-project model element, and distribute the updated master schema changes to one or more other sub-projects that include the changed model element.

The system shown in FIG. 5A can use various optional features. For example, subscribers can vote on a change being adopted using likes/dislikes, thereby embodying democratic inclusion, with a deciding scheme such as a threshold for acceptance of the change, or unanimous voting for inclusion. In one embodiment, if it is determined that the extent of an identified change to a sub-project model element is below a predefined threshold, then those other sub-projects that include the changed model element are automatically updated according to the identified change to the sub-project element. In one embodiment, if it is determined that the extent of the identified change to a sub-project model element is above a predefined threshold, acceptance of the identified change is requested and those other sub-projects that include the changed model element are updated according to the identified change to a sub-project model element only if the requested acceptance is received. A priority can be assigned to changes for inclusion (such as mandatory, optional or recommended). A product target date can be assigned to a change, so that subscribers can decide when to accept the change. The changes can also be grouped into a functional hierarchy, and part of the hierarchy can be accepted by the subscribers. For example, a regulatory requirement such as Basel II might consists of five main sections (numbered 1 to 5), with three subsections per section (labelled a to c), so a subscriber could accept section "1.a" of the regulatory requirement.

The system of FIG. 5A provides the harvesting and redistributing of changes from a sub-project. For example, three sub-projects pertaining to banking, insurance, and healthcare development could have been created by the system from a suitable master schema. As part of the initial generation of the sub-projects, the entity "geographic area" has been determined to be an integral part to all three sub-projects, this would be due to high linkage across all model elements in the master schema. In this case, "geographic area" represents geographic locations such as addresses, countries and states, etc.

Within the insurance sub-project, a developer decides to extend "geographic area" so that it also incorporates an attribute to indicate that a location/address is within a reasonable commutable distance from a medical center of excellence. For insurance purposes this might indicate that an insurance customer is entitled to a special discount due to their proximity to a center of excellence. The developer adds a description of the attribute's purpose and also maps the attribute to a selection of glossary terms that describe the attribute from a business perspective such as "proximity", "center of excellence", "medical", "healthcare" and "policy determiner". The developer then delivers the changes to the insurance sub-project. The system is notified of the change via standard source control management systems, similar to continuous integration notification protocols.

The system performs an analysis of the new change to determine to which sub-projects the change should be pushed. An initial analysis shows that the entity is common to all three sub-projects and also that the attribute has been mapped to "center of excellence" in the glossary. There is also an indication that it is common to all three sub-projects since banking, insurance, and healthcare would all model center of excellences in their own context. The system then looks at the description of the attribute and the glossary terms it has been mapped to. From semantic equivalence, the system determines that the description contains words that relate to healthcare and this is reinforced from the mappings to the terms "medical" and "healthcare". This means the attribute is a candidate for the healthcare sub-project. The system does not find any words in the description that would indicate a strong connection to the banking sub-project. Also none of the mapped terms, apart from "center of excellence", relate to banking. Given that only one term out of five is banking related this would indicate the attribute is only loosely related to banking and should not be pushed to the banking sub-project.

The system now sends a notification, to only the healthcare team, that changes relevant to the healthcare sub-project are available, and if the healthcare team accepts the changes, the system can deliver the changes directly into the healthcare team's live development models. The banking team never sees any such notification due to its lack of relevance. The system distributes the updated master schema changes to one of the other sub-projects that include the changed model element. In order to determine whether a sub-project receives the update, a relevancy test is applied, which will only update a specific sub-project if sufficient content of the updated element matches content within the specific sub-project.

Figure 5B:
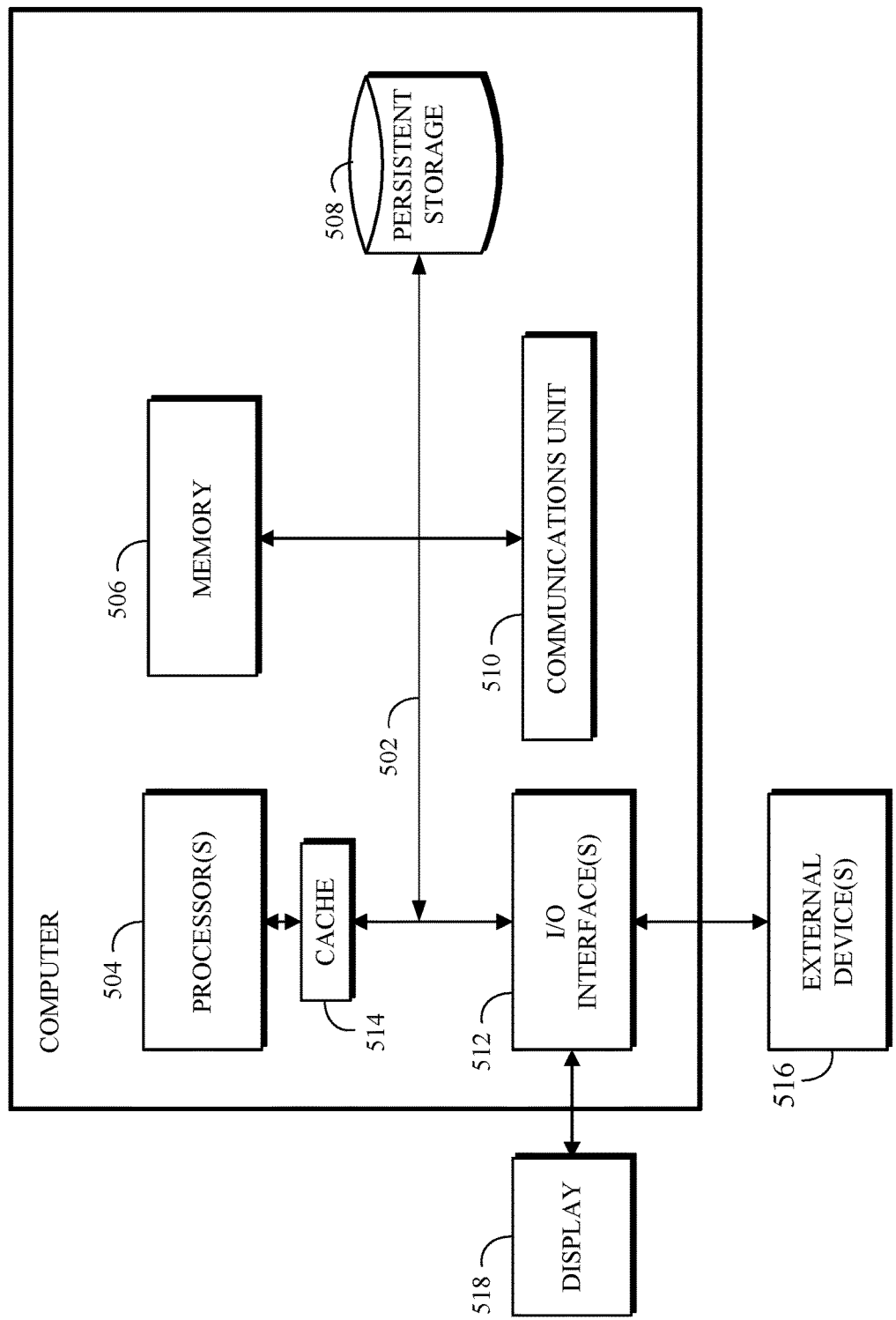
FIG. 5B is a block diagram depicting various components of one embodiment of a computer suitable for executing the methods disclosed herein.

FIG. 5B depicts a block diagram of components of a computer system 500, which is an example of a system such as server 20 within computing environment 500A of FIG. 5A, in accordance with an embodiment of the present invention. It should be appreciated that FIG. 5B provides only an illustration of one implementation and does not imply any limitations with regard to the environments in which different embodiments can be implemented. Many modifications to the depicted environment can be made.

Server 20 includes processor(s) 504, cache 514, memory 506, persistent storage 508, communications unit 510, input/output (I/O) interface(s) 512 and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506.

Program instructions and data used to practice embodiments of the present invention, e.g., fragmentation and a harvesting process 400 are stored in persistent storage 508 for execution and/or access by one or more of the respective processor(s) 504 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, server 20. In these examples, communications unit 510 includes one or more network interface cards. Communications unit 510 may provide communications through the use of either or both physical and wireless communications links. Program instructions and data used to practice embodiments of fragmentation and a harvesting process 400 may be downloaded to persistent storage 508 through communications unit 510.

I/O interface(s) 512 allows for input and output of data with other devices that may be connected to each computer system. For example, I/O interface(s) 512 may provide a connection to external device(s) 516 such as a keyboard, a keypad, a touch screen, a microphone, a digital camera, and/or some other suitable input device. External device(s) 516 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for maintaining a master schema comprising:
    automatically fragmenting a master schema into a plurality of sub-projects corresponding to a discrete set of business focus areas by:
        (i) classifying one or more model elements of the master schema as assigned to one or more of the business focus areas using semantic equivalence, wherein the semantic equivalence is determined based on synonyms, hypernym/hyponym inheritance, or holonym analysis,
        (ii) applying a set of inference rules to assign one or more unassigned model elements to one or more of the business focus areas, and
        (iii) applying a set of modelling constraints to ensure referential integrity of assigned model elements;
    monitoring the business focus areas to identify a change to a model element in a business focus area of the business focus areas;
    updating a model element of the master schema according to the identified change; and
    distributing the updated model element to one or more other business focus areas that the model element is assigned to.

2. The computer-implemented method of claim 1, wherein the master schema is stored in a cloud-based computing environment.

3. The computer-implemented method of claim 1, wherein the business focus area and the one or more other business focus areas are subscribed to by different subscribers.

4. The computer-implemented method of claim 1, wherein each model element comprises an element name and an element definition.

5. The computer-implemented method of claim 1, wherein the semantic equivalence is based on industry specific standards.

6. The computer-implemented method of claim 1, wherein the updated model element is distributed to the business focus areas that the model element is assigned to.

7. The computer-implemented method of claim 1, wherein the updated model element is distributed via a source control management system.

8. The computer-implemented method of claim 1, wherein the set of inference rules ensures assignment of related model elements.

9. The method of claim 1, wherein the fragmenting further includes applying a set of modelling constraints, wherein applying the set of modelling constraints ensures referential integrity of assigned model elements by assigning one or more additional unassigned model elements that are required by the assigned model elements to one or more of the business focus areas.

\* \* \* \* \*